United States Patent [19]
Halvorson et al.

[11] Patent Number: 5,697,836
[45] Date of Patent: Dec. 16, 1997

[54] METHOD FOR PROCESSING POULTRY

[75] Inventors: David A. Halvorson, Falcon Heights; Jonathan Chaplin, Minneapolis; Scott Richard Holicky, LeCenter; Sally L. Noll, St. Paul, all of Minn.

[73] Assignee: Regents of the University of Minnesota, Minneapolis, Minn.

[21] Appl. No.: 612,609

[22] Filed: Mar. 8, 1996

Related U.S. Application Data

[63] Continuation of Ser. No. 426,277, Apr. 21, 1995, abandoned.

[51] Int. Cl.⁶ ..................................................... A22C 21/00
[52] U.S. Cl. ........................... 452/120; 452/106; 452/160
[58] Field of Search ............................. 452/120, 106, 452/107, 155, 160

[56] References Cited

U.S. PATENT DOCUMENTS

| | | | |
|---|---|---|---|
| 1,433,628 | 10/1922 | Knaust | 452/107 |
| 3,518,718 | 7/1970 | Barefield | 452/120 |
| 3,663,991 | 5/1972 | Harben, Jr. | |
| 3,921,255 | 11/1975 | LaBarber | |
| 3,927,440 | 12/1975 | Sindler et al. | 452/120 |
| 3,975,796 | 8/1976 | LaBarber | |
| 4,059,868 | 11/1977 | Meyn | 452/120 |
| 4,265,001 | 5/1981 | Hathorn et al. | 452/120 |
| 4,283,813 | 8/1981 | House | |
| 4,339,849 | 7/1982 | VanMil | 452/120 |
| 4,418,445 | 12/1983 | Meyn et al. | 452/120 |
| 4,467,500 | 8/1984 | Olson | 452/120 |
| 4,731,907 | 3/1988 | Tieleman | 452/120 |
| 5,186,679 | 2/1993 | Meyn | 452/117 |
| 5,279,517 | 1/1994 | Koops | 452/118 |
| 5,292,278 | 3/1994 | Neal et al. | 452/176 |

*Primary Examiner*—Willis Little
*Attorney, Agent, or Firm*—Westman, Champlin & Kelly, P.A.

[57] ABSTRACT

The method of processing poultry comprises the slitting of a poultry carcass along at least one lateral side from the thoracic inlet to the midline of the abdomen, to permit separating a breast portion of the poultry carcass from the back by hinging along an opposite lateral side from the cut. This opens the carcass for evaluation of bacterial contamination of internal organs. The location of the cut is along a line where few bones need to be severed, and the internal organs are not broken or torn, which is a major cause of contamination in conventional poultry processing methods. The longitudinal cut extends from the neck to the pubis and when the breast portion, including the wing on the lateral side where the cut is made is moved, air sac membranes and fat layers will contain the intestines and form separation planes to separate the breast portion from the liver, spleen, heart and intestines. The processing can be mechanized. Processing is greatly speeded up as well and there is a reduction in likelihood of contamination.

14 Claims, 7 Drawing Sheets

METHOD FOR PROCESSING POULTRY

This is a continuation of Ser. No. 08/426,277, filed Apr. 21, 1995, now abandoned. Priority of the prior application is claimed pursuant to 35 USC § 120.

This invention was made with Government support under 93-37500-9253 awarded by the U.S. Dept. of Agriculture. The Government has certain rights in this invention.

BACKGROUND OF THE INVENTION

The present invention relates to a method of opening chicken or other poultry carcasses for inspection and evisceration with a reduced likelihood of contamination.

The method of removing internal organs from poultry essentially has not changed since early fowl hunting. Modern processing plants have simply automated the process, and the disassembly of the poultry carcass usually occurs after it has been hung on a moving line of shackles. The standard method is that the poultry is humanely slaughtered and the feet, feathers and heads are removed. Then a cut is made through the abdominal wall below the vent. This is done while the bird is retained in shackles for automated handling, either hung upside down (chicken broilers) or in a three point suspension (turkeys). One such automated device is shown in U.S. Pat. No. 3,663,991. Usually a hole is precut in the abdominal wall, and in U.S. Pat. No. 3,663,991, the poultry or other fowl is hung upside down, and a spoon is used for automatically removing the viscera.

The present methods where the abdominal wall is opened, tend to risk contamination by slicing, rupturing, or even squeezing the intestines so that intestinal matter or fecal matter will leak and contaminate the bird. Methods of removing the vent, without damaging the intestines have been advanced, but still the percentage of bird contaminated is substantial. One device for removing sphincters and the lower colon of a bird is shown in U.S. Pat. No. 3,921,255. Individual inspection devices have also been advanced. For example, U.S. Pat. No. 4,283,813 discloses a shackle line that is designed to eliminate the necessity for the inspector to touch the birds during inspection. Contamination from one bird will not be easily transferred to another. Again, in this instance, the abdominal cavity is open, and the internal organs are inspected through the rear of the bird.

An automated device for eviscerating poultry or other birds utilizing a suspended shackle system and an automated spoon is shown in U.S. Pat. No. 5,279,517. Patent '517 points out that the known methods cause problems and that it is disadvantageous if the entrails or viscera hangs downwards over the back of the bird, as will sometimes happen in a system where the birds are inverted and the viscera is removed through an upwardly facing abdominal cavity opening. One of the other features of the device shown in Patent '517 is that the spine is held horizontally during evisceration.

U.S. Pat. No. 5,292,278 discloses a method of reducing fecal leakage and contamination during meat and poultry processing, which calls for sealing portions of the carcass using a quick curing adhesive.

The carcass is visually inspected for contamination, and after the inspection, the viscera is removed.

It is well documented that there is an increase in contamination that occurs in a poultry processing plant during evisceration using most existing methods.

SUMMARY OF THE INVENTION

The present invention relates to a method or process which allows carcasses of poultry (also called birds) to be opened much like a clam. The carcass, after humane killing and removal of the head, feet and feathers, is opened by incising through the thoracic inlet, cutting through the scapula between the wing and the spine and then incising the ribs and the abdominal wall with a slice that cuts the ribs joining the spine of the bird and the breast and cutting the skin on the abdomen without damaging the internal organs. The breast, the wings detached from the spine and the skin covering the abdominal opening can be then folded open toward the side opposite the cut to expose the internal organs for examination, without damaging the internal organs. The cut along the lateral side of the poultry is in a location which is adequately spaced a more substantial distance from the internal organs that cause contamination than when the cut is made into the abdominal wall itself. A sliding probe also can be inserted along the internal surface of the lateral side to be cut and the cut made by guiding along the probe, with the probe protecting the organs.

The opening of the breast by folding it away from the back along the side of the bird opposite from the cut exposes the internal organs that require examination, including the heart, liver, gizzard and the intestines. The organs may remain in place in the carcass, or the viscera and crop may be removed and left hanging from the birds, and inspection can be made either before or after drawing the entrails out.

After removal of the viscera, the bird can be processed in a normal manner, such as removal of the lungs with a vacuum machine, and cleaning with inside and outside washer mechanisms. The neck can be taken off at any place along a line.

It should be noted that a cut to separate the ribs from the back portion of the bird can be made along both lateral sides of the bird, and the entire breast and wings portion removed, or left partially attached at the abdominal wall and suspended from the remainder of the carcass for inspection and further processing. The bird can be maintained in a back down, horizontal position, which is now done in some processes, or can be supported hanging from the legs on shackles on a conveyor.

The present method provides a unique and separate location along the lateral side of the bird to sever the ribs from the back and spine, and to permit the shoulder joint to be disengaged so that the breast, and at least one wing can be pivoted for opening the interior cavity with the heart, liver, gizzard and other organs in place in the back portion of the carcass. The slit can be formed without actually slicing parts with a knife or clippers. Bones can be slit or broken and the skin actually separated by pulling the carcass and breast bone apart.

The present invention provides a method of processing birds that reduces likelihood of contamination, reduces labor costs and reduces motions that are less likely to lead to repetitive motion disorders. Also, the organs of the bird remain oriented in identifiable positions so computer assisted inspection is simplified.

DETAILED DESCRIPTION OF THE PREFERRED EMBODIMENTS

Figure 1:
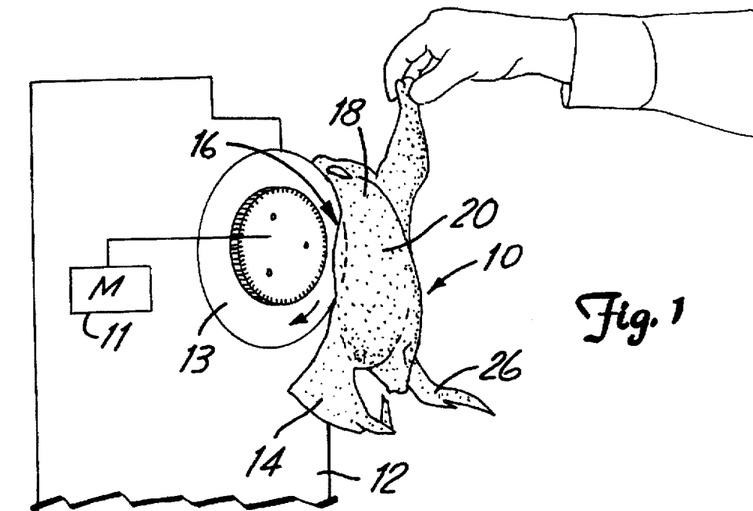
FIG. 1 is a schematic representation of a typical arrangement for making a cavity opening cut along the lateral side of a bird as a first step in the method of the present invention.

In FIG. 1, a carcass of a chicken (called a bird) is schematically shown supported adjacent to a knife assembly 12 that has a rotating or circular knife 13. The knife 13 has a sharpened edge, and when rotated by a motor 11 will make an incision immediately below the left wing 14 on the inverted bird that is between the wing and the spine, and along the lateral side 16, from the thoracic inlet and in the preferred embodiment to the abdominal wall indicated generally at 18. In the position shown, the knife 13 is slicing through the scapula and the mid regions of ribs that extend from the breast portion 20 of the bird 10 to a back carcass or spine portion 24 shown in FIG. 2. The support for the carcass during the cut or slice can be any desired clamp or holding device. The cut or slit can be angled, and not a straight line to achieve the position least likely to damage internal organs. The knife can be rotated along the long axis of the bird while the bird is held straight, or the bird can be rotated as the cut is made.

Figure 2:
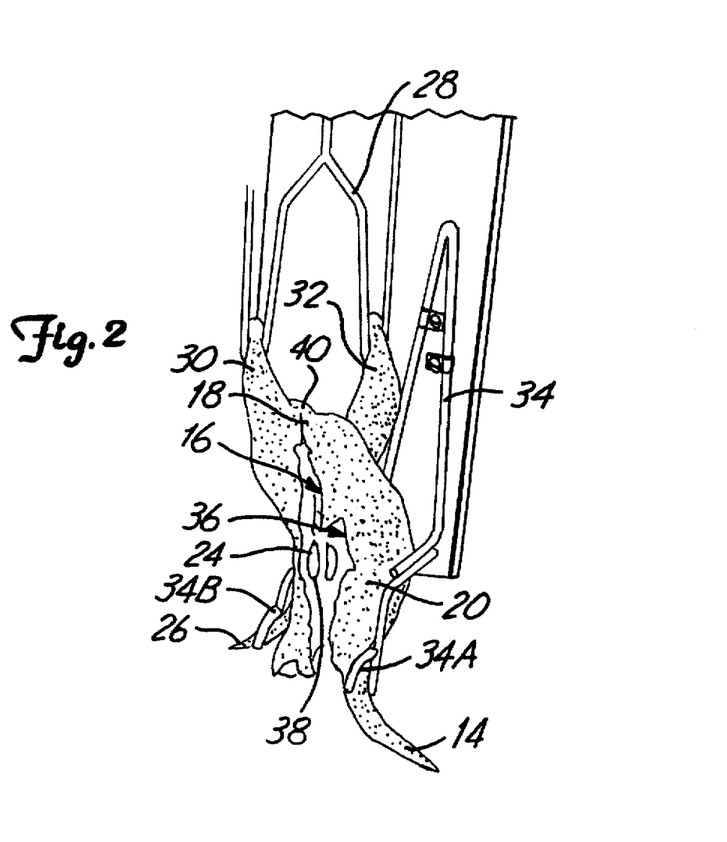
FIG. 2 is a schematic representation of a shackle arrangement which would pivot the breast and wing to open an internal cavity of the bird after making the cut shown in FIG. 1.
Figure 3A:
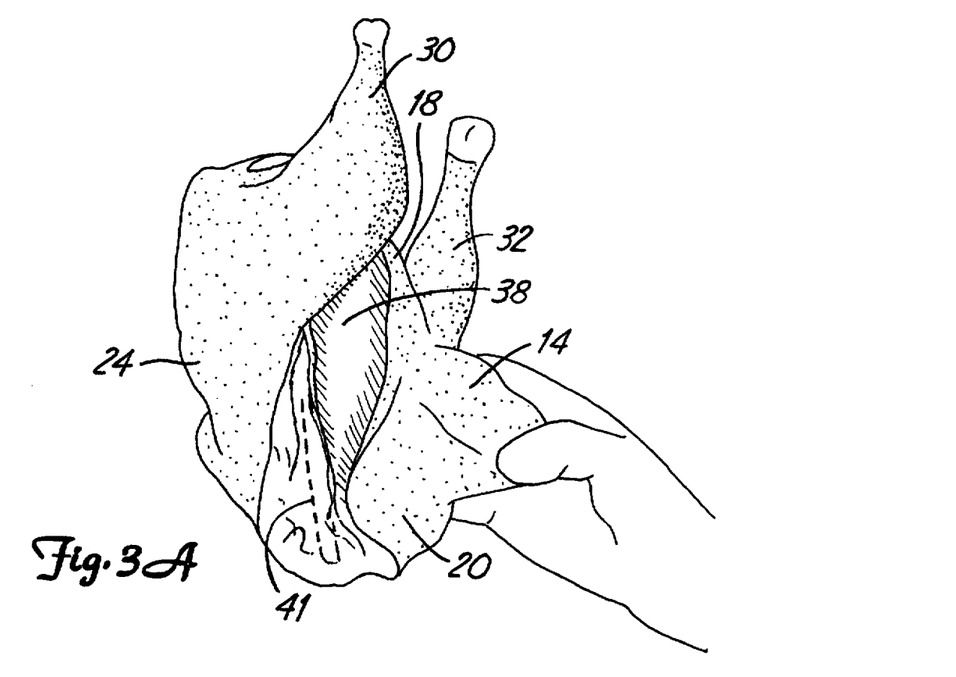
FIG. 3A is a schematic representation of the internal cavity of a bird with the breast and wing held laterally open from back carcass portion of the bird.

The right wing 26 remains intact, and when the bird is suspended from shackles 28 holding the legs 30 and 32, a separate shackle assembly 34 having a yoke 34A and 34B for each of the left and right wings 14 and 26 can hold the bird in a partially opened position. The breast portion 20 opens like a clam relative to the back carcass portion 24, to provide an enlarged opening 36 through which internal organs shown at 38 can be examined. It can be seen that the vent area indicated at 40 is undisturbed. The slit of opening formed in the abdominal wall 18 permits the opening of the carcass to the position essentially as shown in FIG. 3A, where the viscera is available for inspection.

The back carcass portion 24 includes the legs 30 and 32, and the spine and back rib portions. Breast portion 20 includes the breast and the wing or wings that are detached from the back carcass portion and remain attached to the breast bone.

Figure 3B:
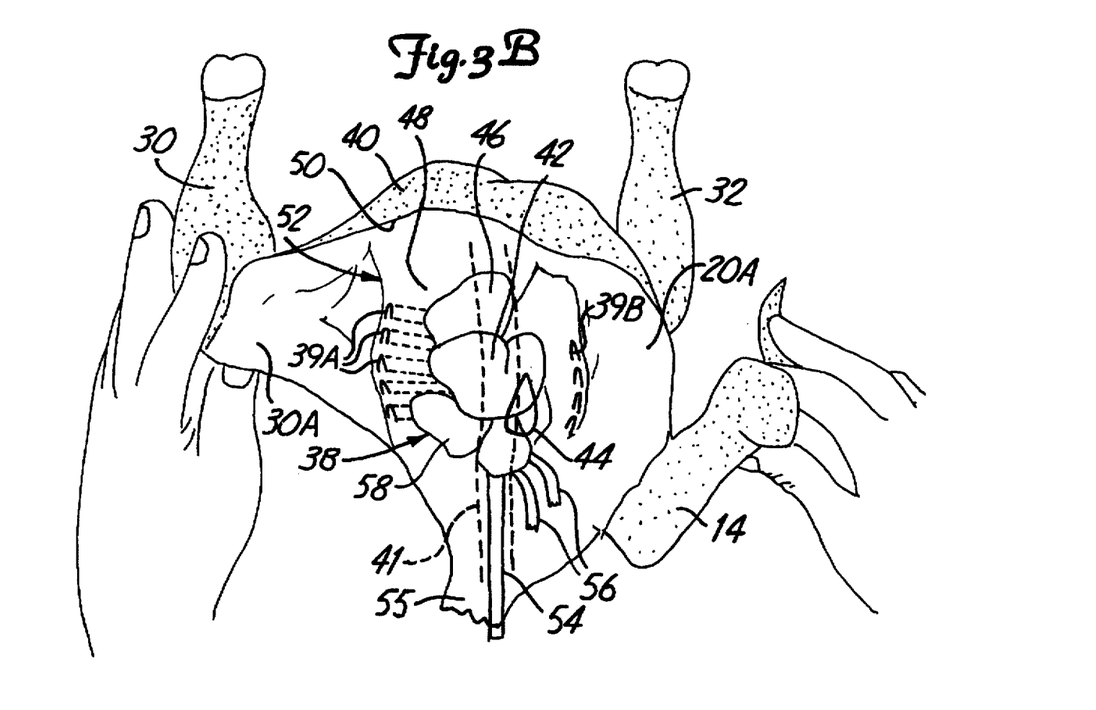
FIG. 3B illustrates the representation of the internal organs of the bird with the breast portion moved to laterally open the internal cavity.

The back carcass portion 24 supports the viscera in place in the body cavity. Several of the organs are attached to the back carcass portion 24, such as the lungs and connecting tissue. The breast portion 20 and left wing 14 can be pulled out of the way. The breast portion 20 will separate relative to the viscera 38 because air sacs and fat form separation planes along the interior of the breast bone and ribs. It should be noted that the incision can either cut through the shoulder joint, or the joint itself can be disengaged quite easily to provide the opening of the breast 20. The bones at the thoracic inlet may be cut, snipped or broken to leave the exposed back meat and backbone or spine 41 holding the viscera 38. Back rib portions shown only schematically at 39A in FIG. 3B are severed from breast rib portion 39B. The back rib portions remain with the spine 41 on both sides. The rib portions are shown schematically and are not intended to represent the actual number or relative size of the ribs.

As shown in FIG. 3B, when the leg 30 is separated and moved so that the thigh 30A is spread, and the left wing 14 is moved, the interior surface 20A of the breast will be exposed and the organs requiring inspection will also be exposed. As shown in FIG. 3A the liver 42, the heart 44 and the gizzard 46 all are visible and substantially undisturbed for inspection. The organs to be inspected are on top of the rest of the entrails. With further opening movement, the lung shown at 58 can be observed.

The covering of fat that is represented generally at 48 overlies the intestines, and the incision along the skin of the abdominal cavity, ending at about point 50 in FIG. 3B, will separate to permit inspection. A wide opening is made relative to the sack for the intestines along the line 52 by spreading the thigh 30A.

The esophagus 54 is down along a neck portion 55, and the connecting arteries and the like will stretch sufficiently so that they will not rupture for this inspection. Typical arteries are shown at 56.

In summary, the method comprises making an incision from the thoracic inlet across the ribs and into the skin covering the abdominal cavity, and then pulling the breast portion 20 in a direction away from the back to expose the viscera and create a separation along layers of fat and the exterior of air sac membranes.

Figure 3C:
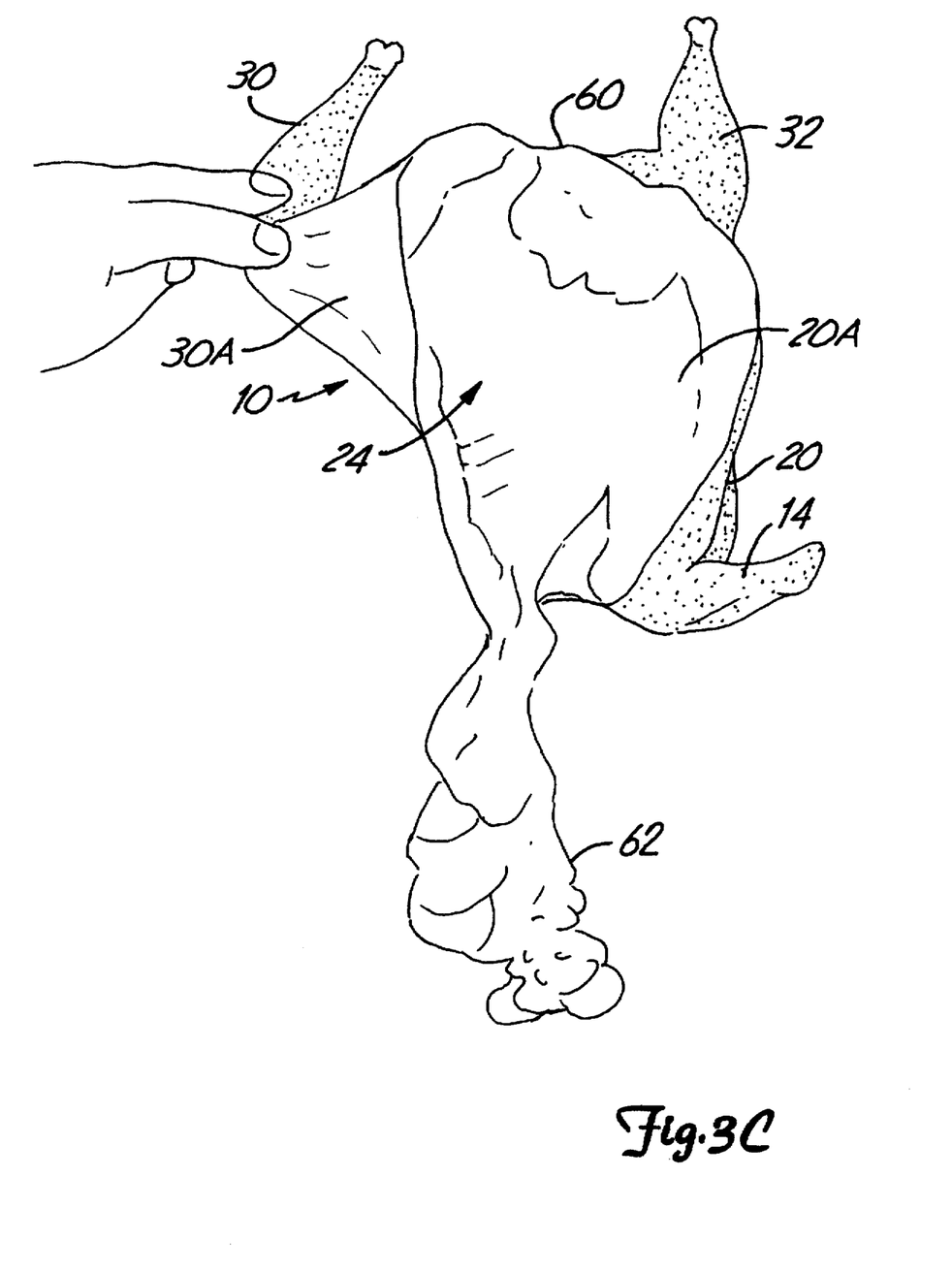
FIG. 3C is a representation of the viscera after being removed from the carcass, and hanging downwardly from the bird.

FIG. 3C illustrates the bird 10 of FIG. 3B with the vent cut away from the region shown at 60, and then the entrails or viscera indicated generally at 62 hanging downwardly. The entrails will remain attached by blood vessels to other parts such as the lungs, which remain in the back carcass portion 24. This inspection can be made in this condition, if desired. The entrails can be removed; the lungs vacuumed out of the back carcass portion 24; and the bird carcass then washed and further processed.

Figure 4A:
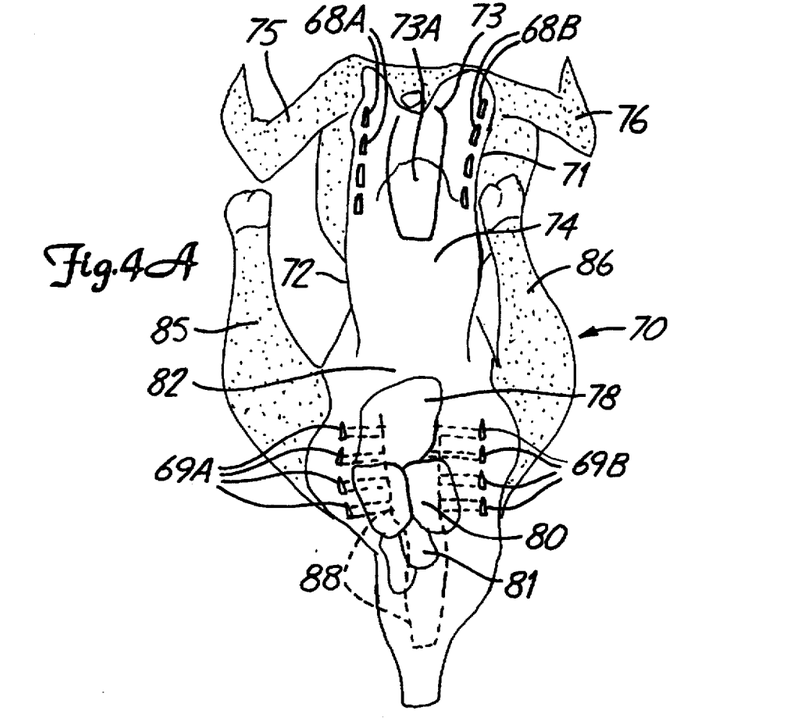
FIG. 4A is an illustration of a modified method of the invention, showing a bird carcass that has had two lateral cuts along opposite sides, with the breast portion folded upwardly from the carcass between the legs along the abdominal skin.

In FIG. 4A, the method is modified by forming the lateral separation slits under the wings of the bird 70 (between the wings and the spine) on both sides of the breast or rib cage, to sever the central rib portions (68A and 68B) attached to the sternum from back rib portions 69A and 69B which remain attached to the spine. The back rib portions remain with a spine or back bone structure 88 to form a back carcass portion 84. In this instance, separation lines are made as shown at 71 and 72 on each side of the bird in the manner previously explained, and the breast portion 73 is folded upwardly along a fold in the abdominal wall shown at 74, so that the left and right wings 75 and 76, respectively, are carried with the breast portion 73. The breast portion folds between legs 85 and 86. The underside of the breast bone is shown generally at 73A.

Figure 4B:
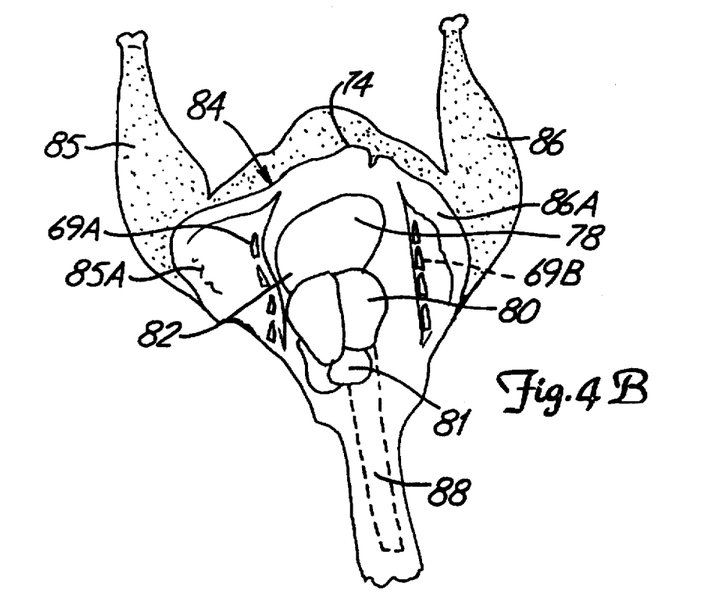
FIG. 4B is a schematic view when the breast portion has been cut away from the back carcass portion.

The breast bone 73A will separate from the internal organs along a layer of fat that lies along the gizzard shown at 78. The liver shown at 80 will be exposed as will the heart 81. The layer of fat and membranes defining air sacs underlying the breast bone permits separating the breast bone and the skin from the abdominal cavity in the back carcass portion 84. A skin severing separation, preferably with a cut in the region of the abdominal wall 74, transversely across the abdominal wall will leave the viscera 82 in the internal cavity 83 defined by the back carcass portion 84. The entire breast portion 73 along with the wings 75 and 76 can be removed leaving the back carcass portion 84, and legs 85 and 86 as one part, with the entrails or viscera 82 remaining in the carcass cavity for inspection, removal and further processing or inspection after removal.

Figure 4C:
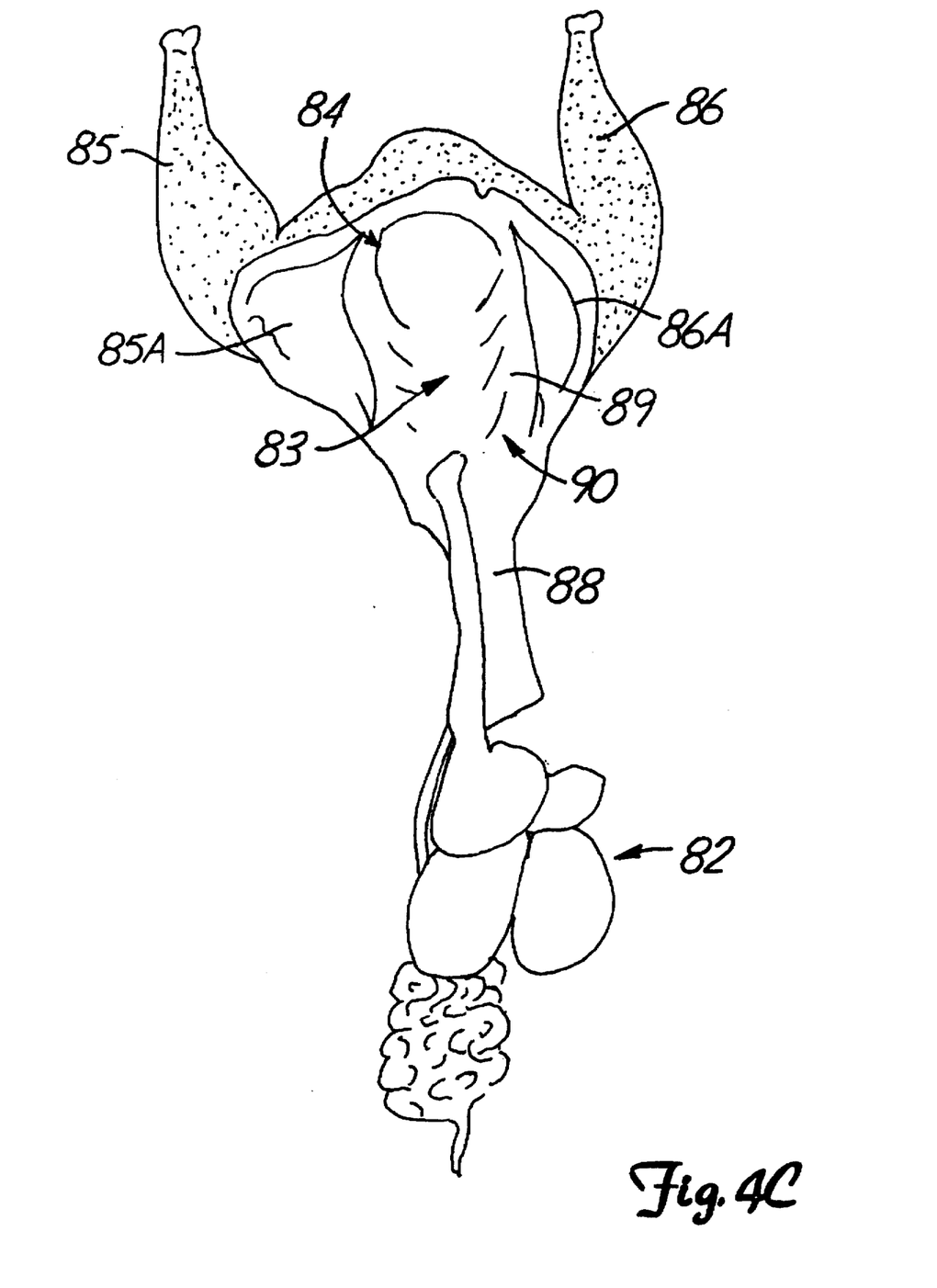
FIG. 4C is a schematic representation of the viscera removed from the back carcass portion of the bird and hanging for inspection prior to removal.

The spine shown at 88 will remain in place, and the viscera 82, as shown in FIG. 4C can be permitted to hang downwardly. The body cavity indicated generally at 83 can be cleaned by removal of the lungs and remaining organs, most likely kidneys. The legs 85 and 86 and thighs 85A and 86A are moved apart to expose the backbone 90 and portions of the ribs 89 that extend around the back so that the viscera can easily be scooped out. This also allows for the easy removal of the breast portion (FIG. 4A) prior to disturbing the viscera, thus greatly reducing that risk of contamination.

Figure 5A:
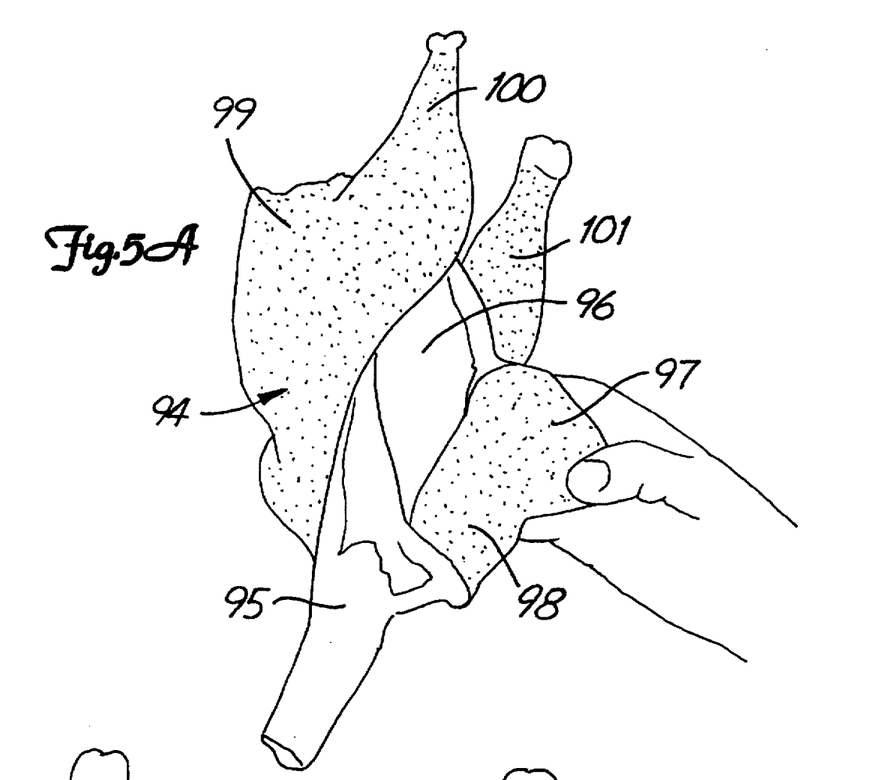
FIG. 5A is a modified form of the present invention with an initial cut being in essentially the same position as that shown in FIG. 3A.
Figure 5B:
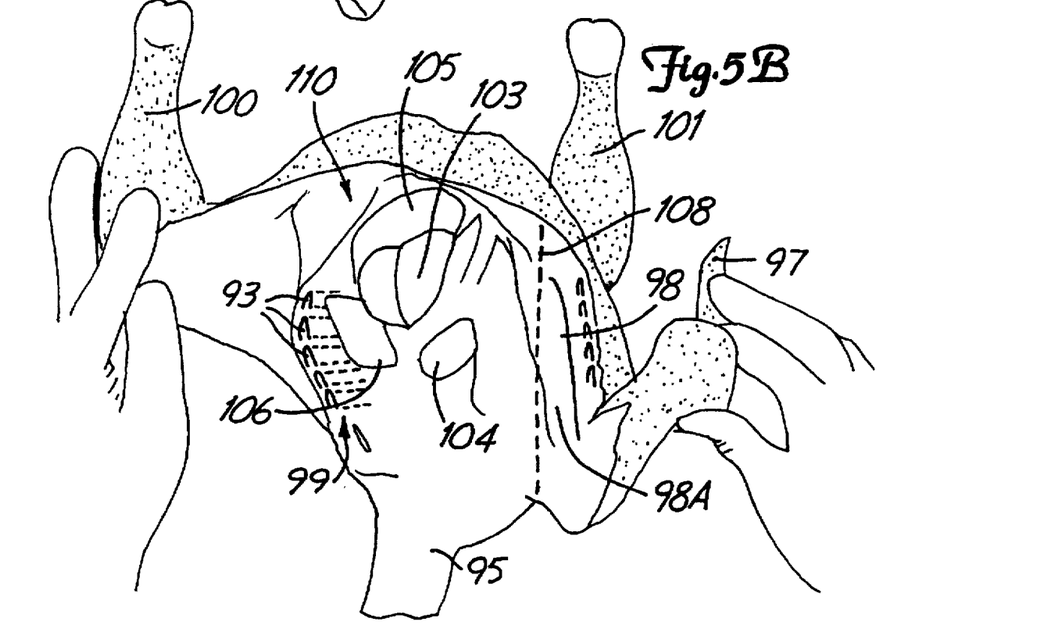
FIG. 5B is a view showing the internal organs in place in the carcass, after the wing and breast have been folded open similar to FIG. 3B.

FIGS. 5A through 5D are procedures similar to the previously shown procedures or processes. In FIG. 5A, a separation line, forming a slit is made on a bird 94 through the lateral thoraco-abdominal wall, as indicated at 96. This separation line, as before, is between the wing 98 and the spine 95 to sever the back ribs 93 from the breast 98 where the ribs extend back to the spine of the bird. The one wing 97, and breast 98 can be moved away from the back carcass portion 99, which includes the legs 100 and 101, respectively. When the breast portion 98 and wing 97 are folded open, the liver 103, heart 104, and gizzard 105 are exposed. Also a portion of the lung shown at 106 may be exposed.

Figure 5C:
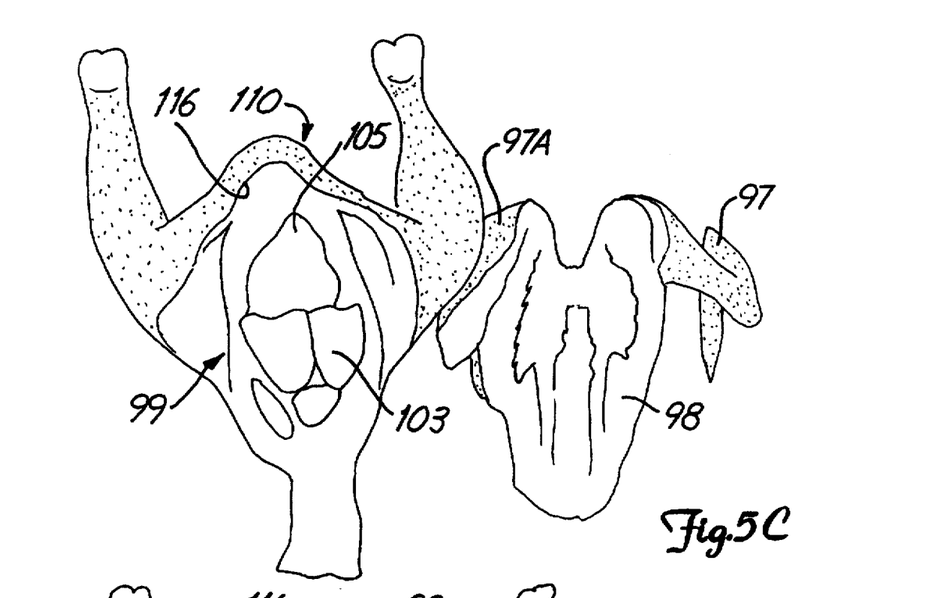
FIG. 5C is a view after the breast portion and wings have been sliced on both sides and severed from the back by making an additional cut along the previously uncut side.
Figure 5D:
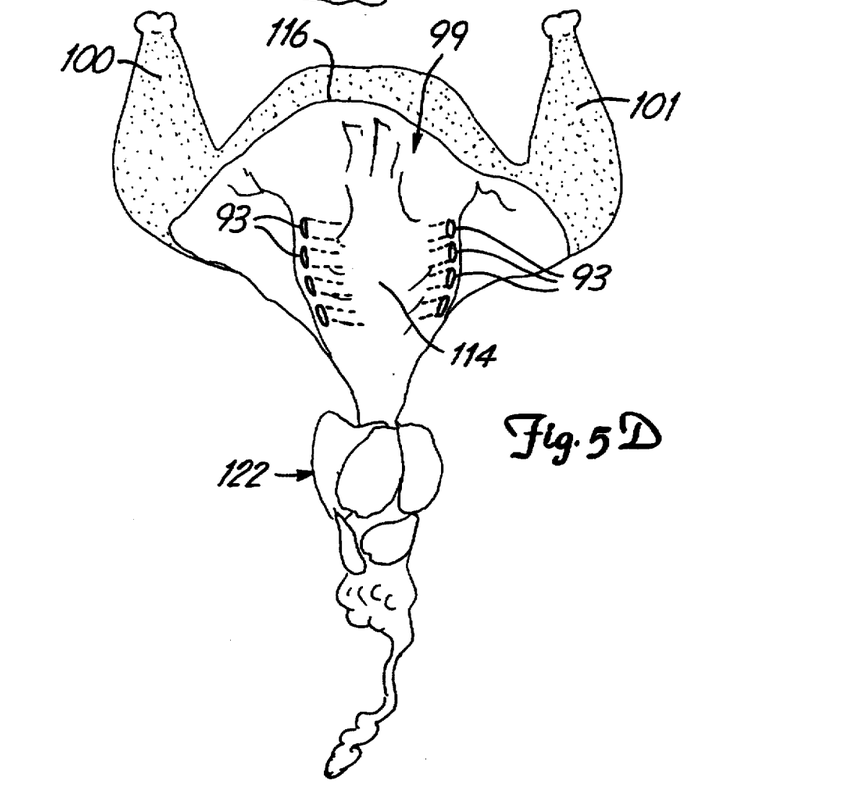
FIG. 5D is a schematic representation of the bird of FIG. 5C with the viscera removed and hanging from the bird for inspection.

Then in this form of the invention, a separation line or slit is made generally along the dotted line shown at 108, at the opposite lateral side of the bird, to completely sever the breast portion 98 which includes breast 98A and wings 97 and 97A (FIG. 5C) from the back carcass portion 99. The breast portion 98, which is shown in FIG. 5C completely separated, can be processed independently of the back carcass portion 99. As shown in FIG. 5D, the viscera 112 can be permitted to hang down from the body cavity 114 in the back carcass portion 99. The back carcass portion and legs 100 and 101 are left intact for further processing as well. The inspection can take place with the entrails in the positions shown in either FIGS. 5B or 5C, because the organs that are to be inspected are clearly visible while in place. In this form of the invention the entire breast portion 98 including breast 98A and wings 97 and 97A is removed. The separation lines or slits 96 and 108 along the lateral sides of the bird can be made prior to folding the breast portion 98 away from the back carcass portion 99, if desired, so that the entire breast portion 98 could be removed at one time merely by severing or tearing any skin remaining at the thoracic inlet after removal of the neck and separating the abdominal wall generally along the line shown at 116 in FIGS. 5C and 5D.

The present process thus starts with forming a separation line or slit on a bird, such as a chicken, turkey, or other bird extending from the thoracic inlet, between the attachment of the wing and the spine, and then toward the thoraco-abdominal junction by severing the ribs from the breast and the back, and separating the abdominal cavity wall. The slit can be formed by snipping or cutting bones and tearing the skin and abdominal wall, as is done in some processing. The slit extends to about the midline of the abdomen. Then the breast portion is opened, which means in the present invention either folded away along a fold line on the lateral side of the bird opposite from the slit made, or completely removing the breast while leaving the internal organs in place in the body cavity defined by the back carcass portion. Subsequent removal of the viscera or entrails is done by severing the abdominal wall around the vent in a known manner. Because the severing of the vent can be made in an open, unobstructed manner, the chances of any contamination from such severing are greatly reduced. Inspection can be carried out either with the entrails in the body cavity or away from the back carcass portion.

The use of the longitudinally extending separation line along the lateral side or sides to sever the breast portion from its attachment to the back or body carcass portion of the bird provides for a unique method of opening the bird or chicken for inspection and subsequent cleaning and processing for human consumption.

The preferred form of the invention is to use knives or saws to form the slits along the separation line made for opening the bird, but partial cuts can be made to sever major bones, such as the scapula, and then the skin and connecting tissue can be torn along the separating line. The separation of the skin is relatively easily done, and even breaking the ribs and other bones can be accomplished without adversely disturbing the viscera, if care is used. Thus, the forming of the longitudinal slits, while preferably done by cutting, also can be done by disjointing parts and/or cutting or snipping bones and opening the rest of the slits by tearing.

The present invention permits opening a bird without disturbing the viscera to reduce the risk of bile contamination from a ruptured gallbladder and reduce the risk of bacterial contamination from feces or ingesta, which have a direct effect on food quality.

Although the present invention has been described with reference to preferred embodiments, workers skilled in the art will recognize that changes may be made in form and detail without departing from the spirit and scope of the invention.

What is claimed is:

1. A method of opening a cavity in a body of a bird, comprising:

forming at least one longitudinal separation in the body to initially open the cavity by severing portions of the body of the bird along a side of the bird laterally of a spine sufficiently to permit separating a wing of the bird from the spine; and accessing the cavity in the bird by separating a breast bone and attached breast rib portions from the spine along the at least one longitudinal separation initially formed by the forming step without disturbing internal organs in the cavity of the bird.

2. The method of claim 1 including the step of removing viscera of the bird through the opening formed by the opening step.

3. The method of claim 1 including forming the at least one longitudinal separation by slitting the body of the bird along the side of the bird laterally of the spine.

4. The method of claim 3 including the step of making a second longitudinal separation in the body open to the cavity on an opposite lateral side of the bird from the side having the at least one longitudinal separation to separate a second wing from the spine and to separate breast rib portions from back rib portions on such opposite lateral side, and separating portions of an abdominal wall of the bird between the two longitudinal separations to remove a breast portion from a back carcass portion forming the cavity.

5. A method of opening a body cavity of a bird having a spine, a pair of wings, ribs between the spine and a breast bone, and having internal organs, including viscera coupled to a vent through an abdominal wall, comprising the steps of;

forming a longitudinally extending slit along a lateral side of the bird to separate one wing from the spine and separating breast rib portions and a breast bone from back rib portions and the spine on the one lateral side, the back rib portions and spine forming the bodily cavity;

opening the body cavity by separating the breast bone and breast rib portions from the spine and back rib portions along the formed slit, the separation occurring along layers of fat and membrane to leave the internal organs exposed in the body cavity when the breast bone and breast rib portions are moved a sufficient distance from the back rib portions along the one lateral side of the body.

6. The method of claim 5 including the step of removing the viscera, the vent and the surrounding abdominal wall portions, and the organs of the bird through the opening formed by the forming step, and permitting the viscera, vent and organs to remain attached to the backbone rib portions and spine for processing.

7. The method of claim 5 including the further step of forming a second longitudinal slit on an opposite lateral side of the bird to separate a second wing from the spine, the second longitudinal slit separating second breast rib portions from second back rib portions on the second lateral side, the second breast rib portions and second back rib portions forming in part the body cavity, and folding a breast portion comprising the breast bone, wings and breast rib portion to move between legs of the bird to expose internal organs of the bird.

8. The method of claim 7 including the step of opening the abdominal wall between the two longitudinal slits to remove the breast portion from a back carcass portion formed by the spine and back rib portions attached to the spine.

9. The method of claim 8 including the step of further processing the breast portion separately from the body portion.

10. The method of claim 9 including the step of removing the viscera and internal organs from the back carcass portion and permitting the viscera to hang from the back carcass portions prior to inspection and removal.

11. A method of opening a cavity in a body of a bird, comprising:

longitudinally slitting the body of the bird along a lateral side of the bird to separate a wing from a spine;

continue the longitudinal slit and slitting and separating breast rib portions and a breast bone from back rib portions on the one lateral side; and     opening the cavity by separating the breast bone and attached breast rib portions from the back rib portions along a continuous slit formed by the slitting step without disturbing internal organs in the cavity of the bird.

12. The method of claim 11 including the step of removing viscera of the bird through the opening formed by the slitting step.

13. The method of claim 11 including the further step of making a second longitudinal slit on an opposite lateral side of the bird to separate a second wing from the spine and to slit breast rib portions from back rib portions on such opposite lateral side, and slitting an abdominal wall of the bird between the two longitudinal slits to remove a breast portion from a back carcass portion forming the cavity.

14. The method of claim 11 including the further step of making a second longitudinal slit on an opposite lateral side of the bird to separate a second wing from the spine and to slit breast rib portions from back rib portions on such opposite lateral side, while leaving the breast portion attached to an abdominal wall, and folding the breast portion away from a back carcass portion to expose entrails in place in the back carcass portion for inspection.

* * * * *